United States Patent [19]

Piesch et al.

[11] 4,273,669
[45] Jun. 16, 1981

[54] LATENT CURING AGENT FOR THERMOSETTING AMINOPLAST RESINS, ITS MANUFACTURE AND ITS USE

[75] Inventors: Steffen Piesch, Oberursel; Peter Dörries, Frankfurt am Main; Ewald Schmidt, Hanau; Richard Hensel, Maintal, all of Fed. Rep. of Germany

[73] Assignee: Cassella Aktiengesellschaft, Frankfurt am Main-Fechenheim, Fed. Rep. of Germany

[21] Appl. No.: 130,701

[22] Filed: Mar. 17, 1980

[30] Foreign Application Priority Data

Mar. 22, 1979 [DE] Fed. Rep. of Germany ........ 2911265

[51] Int. Cl.$^3$ ........................... C08K 3/30; C08K 5/05; C08K 5/17
[52] U.S. Cl. .................................... 252/182; 525/509; 528/254

[58] Field of Search ........................ 252/182; 525/509; 528/254

[56] References Cited

U.S. PATENT DOCUMENTS

| | | | |
|---|---|---|---|
| 2,830,035 | 4/1958 | Renner et al. | 528/254 |
| 3,336,249 | 8/1967 | Segro | 528/254 |
| 4,038,198 | 7/1977 | Wagner et al. | 252/182 |
| 4,150,007 | 4/1979 | McCollum | 525/509 |
| 4,200,729 | 4/1980 | Calbo | 528/509 |

*Primary Examiner*—Benjamin R. Padgett
*Assistant Examiner*—Irwin Gluck
*Attorney, Agent, or Firm*—Connolly and Hutz

[57] ABSTRACT

A latent curing agent for aminoplast resins produced by reacting diethanolamine with glycidol in a molar ratio of 1:(1 to 1.2) at 0° to 90° C. and then reacting the product with 0.5 to 1 mole of sulfur dioxide per mole of diethanolamine at 0° to 90° C.

6 Claims, No Drawings

LATENT CURING AGENT FOR THERMOSETTING AMINOPLAST RESINS, ITS MANUFACTURE AND ITS USE

The present invention relates to a latent curing agent for aminoplast resins, consisting of or containing the reaction product formed from diethanolamine, glycidol and $SO_2$ in a molar ratio of 1:1.0 to 1.2:0.5 to 1.0, its manufacture and its use in the production of thermosetting aminoplast resins.

Within the meaning of the invention, aminoplast resins are monomolecular or low-molecular condensation products of a component containing amino, imino or amide groups, a so-called aminoplast precursor, with a carbonyl compound and optionally a lower alkanol (compare Ullmanns Enzyklopädie der technischen Chemie ("Ullmann's Encyclopaedia of Industrial Chemistry"), 4th Edition, Volume 7 (1974), pages 403 to 424). The following aminoplast precursors are suitable for the production of aminoplast resins: melamine, urea, dicyandiamide, thiourea, substituted melamines, acetoguanamine, butyroguanamine and ethyleneurea.

Aminoplast precursors which are preferred for the production of aminoplast resins according to the invention are melamine and urea.

Examples of carbonyl compounds which can be employed for the reaction with the above aminoplast precursors are formaldehyde, acetaldehyde, isobutyraldehyde, acetone, methyl ethyl ketone and diethyl ketone. Formaldehyde is preferred for use in accordance with the invention. The most important aminoplasts for an industrial point of view are prepared by subjecting the said preferred components, formaldehyde, urea and/or melamine, to a condensation reaction. Aminoplasts within the meaning of the present invention also include those which are obtained by co-condensing modifying components or by subsequently adding modifying agents. Examples of known modifying agents are o/p-toluenesulphonamide, aminosulphonic acid and its salts, caprolactam, glucose, sorbitol, glycol, diglycol, pentaerythritol, sucrose, methylenebisformamide and methylenebisacetamide; carbamates, such as, for example, methyl carbamate and methoxyethyl carbamate, and salts of maleamic and/or fumaramic acid.

The reaction between the aminoplast precursors and the carbonyl compounds is only taken to a stage at which the products still remain soluble and fusible. As soon as this condition has been reached, the condensation reaction is discontinued, for example by cooling and adjusting the pH of the reaction mixture to a slightly alkaline value. The incompletely condensed products thus produced (aminoplast precondensates) are used in the form of their aqueous solutions, in particular as impregnating resins for the laminates industry and for the surface finishing of chipboard and for the manufacture of compression-moulding compounds.

Solutions of aminoplast impregnating resins are used to impregnate papers or fabrics which are used for the production of decorative laminated panels or for coating fibre boards.

For the manufacture of compression-moulding compounds, the aminoplast precondensate is mixed with fillers, such as, for example, cellulose or wood flour. Mouldings of all kinds, such as, for example, casings, control knobs, electrical switches and many other articles, are manufactured from these compression-moulding compounds by compression in heated moulds.

When aminoplasts are processed, the soluble and fusible aminoplast precondensates are changed into infusible and insoluble products. In this process, known as curing, complete crosslinking of the precondensates takes place. However, the rate of this crosslinking reaction is too low for technological processes even at elevated processing temperatures and the reaction must therefore be accelerated by adding so-called curing agents. Compounds which have an acid reaction and/or split off acid are used as curing agents. Known curing agents of this type are ammonium or amine salts, for example ammonium chloride, ammonium thiocyanate or ethanolamine hydrochloride, or strong organic acids, such as, for example, p-toluenesulphonic acid. These known curing agents exhibit substantial disadvantages. Thus the use of free acids or salts with a strongly acid reaction leads to relatively short pot lives, which has a very detrimental effect on processing. Numerous experiments have therefore been carried out in order to find curing agents which only develop their activity at elevated temperatures, such as are used in processing aminoplasts. Curing agents of this type are known as latent curing agents. The known salts, used as curing agents, of strongly basic amines do indeed exhibit a certain latent action, but this leaves a great deal to be desired in practice.

It is also already known (compare British Patent Specifications Nos. 506,004 and 506,003) to use alkyl esters of orthophosphoric acid as curing agents for urea-formaldehyde precondensates. However, these curing agents are also not sufficiently latent and have not been able to maintain a place for themselves in technology.

The disadvantages mentioned of the known curing agents make themselves evident in an intensified manner if the aminoplast resins are to be processed by modern methods, such as, for example, the quick-cycling process. In this connection, the use of very strong curing agents is extremely critical, if the curing times of the moulding press are to be as short as possible, since there is a very great risk of the formation of heat haze on the underside of the sheets as the result of a long contact time on the hot press plate. If gentler known curing agents or smaller quantities of known strong curing agents are used, the moulding time becomes so long that it renders the process uneconomic.

A further considerable risk when strong curing agents are used consists of overcuring the aminoplast resins, which can lead to a considerable reduction in the elasticity of the fully cured product and to the formation of cracks. There is, therefore, an urgent need for thermosetting aminoplast resins which, even with short moulding times, give satisfactory curing as well as an adequate pot life and which do not exhibit the disadvantages of resins to which known curing agents have been added, such as, for example, risk of overcuring, formation of heat haze or damage to processing equipment.

The present invention relates, therefore, to a new latent curing agent which exhibits considerable technical advantages compared with known curing agents.

The latent curing agent according to the invention consists of or contains the reaction product formed from diethanolamine, glycidol and $SO_2$ in a molar ratio of 1:1.0 to 1.2:0.5 to 1.0, preferably 1:1.0 to 1.2:0.7 to 0.85.

Compared with known curing agents, it exhibits a substantially more advantageous latent behaviour, that is to say the curing agent only comes into action at elevated temperatures, but then very rapidly, so that prolongations of moulding times are not necessary, and it exhibits a fairly high resistance against the formation of heat haze.

Aminoplast resin impregnation liquors containing the new curing agent according to the invention exhibit a substantially longer pot life and thus more favourable processing preconditions and reliability than those containing conventional curing agents, while having the same reaction rate under the conditions of moulding.

A further substantial advantage of the curing agent according to the invention is that it does not lead to yellowing of the coated surfaces or laminates.

The curing agent according to the invention can consist only of the reaction product of diethanolamine, glycidol and $SO_2$; it can, however, also be in the form of a mixture with a solvent and diluent which are compatible with the resin, preferably in a mixture with water. It is, of course, possible to use the undiluted reaction product as a curing agent, if care is taken that the highly viscous substance is uniformly distributed and completely dissolved, by means of good stirring, in the aminoplast resin. Compared with the undiluted substance, solutions of the reaction product, especially solutions in water, containing 50–80% of active compound have the advantage of low viscosity and thus can be metered without problems and can be dispersed rapidly and homogeneously in the aminoplast resin.

The curing agent according to the invention is prepared by reacting diethanolamine with glycidol at 0° to 90° C. in a molar ratio of 1:1.0 to 1.2, if appropriate in the presence of a diluent, and then reacting the resulting reaction product at 0° to 90° C. with 0.5 to 1.0 mol of $SO_2$, relative to diethanolamine, if appropriate in the presence of a diluent.

The reaction product of diethanolamine and glycidol is preferably reacted with 0.7 to 0.85 mol of $SO_2$, relative to diethanolamine, and the reaction is preferably carried out at 10° to 55° C. Reaction in the absence of diluents requires special equipment fitted with highly effective, powerful mixing systems and good removal of heat or cooling, in order to remove the considerable heat of reaction.

A considerable simplification is effected if the reactions are carried out in the presence of diluents. It is appropriate to employ 10 to 50% by weight, relative to the total weight of the batch, of a diluent which is compatible with aminoplast resins. In this case, the resulting solutions of the finished reaction product can be added direct to the aminoplast resins. It is particularly advantageous to use water as the diluent; it can at the same time be used for cooling, if added to the batch in the form of ice.

The preparation of the curing agent according to the invention is carried out particularly advantageously if diethanolamine and glycidol are reacted at 0° to 40° C., preferably 10° to 25° C., in the presence of 10 to 50% by weight of water, relative to the total weight of the reactants, and it is advantageous initially to take the diethanolamine and to add glycidol and water or ice gradually, while stirring and cooling.

After the reaction is complete, the necessary quantity of $SO_2$ is passed into the resulting aqueous reaction product at 0° to 40° C., preferably 10° to 25° C., while stirring and cooling and, if necessary, while simultaneously adding water or ice.

The total quantity of water used is such that it amounts to 10 to 50% by weight, preferably 20 to 30% by weight, of the total weight of reactants.

Instead of metering in a specific weighed quantity of $SO_2$, it is very simple in terms of the process and also advantageous in respect of the quality of the products, simply to pass in $SO_2$ until the reaction mixture has a pH value of 6.5 to 7.5, preferably 7.1 to 7.4.

The present invention also relates to thermosetting aminoplast resins containing, as the latent curing agent, the reaction product formed from diethanolamine, glycidol and $SO_2$ in a molar ratio of 1:1.0 to 1.2:0.5 to 1.0, preferably 1:1.0 to 1.2:0.7 to 0.85.

The proportion by weight of the curing agent according to the invention in the thermosetting aminoplast resins according to the invention is 0.1 to 5, preferably 0.5 to 2% by weight.

The thermosetting aminoplast resins according to the invention are prepared by subjecting one or more aminoplast precursors, preferably melamine, urea or mixtures thereof, optionally modifying agents, such as, for example, o/p-toluenesulphonamide, aminosulphonic acid or salts thereof, sorbitol or caprolactam, the carbonyl compound, preferably formaldehyde, and optionally a lower alkanol to a condensation reaction in a manner which is in itself known (compare Ullmanns Enzyklopädie der technischen Chemie ("Ullmann's Encyclopaedia of Industrial Chemistry"), 4th Edition, Volume 7, 1974, pages 403 to 424) at temperatures between 80° to 100° C., preferably between 90° and 95° C., and reaction time being such that the resulting precondensates can be diluted with water within the range from 1:4 to 1:0.1, preferably 1:3 to 1:1.

0.1–5% by weight, preferably 0.5–2.0% by weight, of the curing agent according to the invention are then added to the precondensate, appropriately in the form of a 50 to 90, preferably 70 to 80, % strength aqueous solution, for reasons of simpler handling.

Owing to the good latency of the latent curing agent according to the invention, the thermosetting aminoplast resins according to the invention are very stable at room temperature, so that an adequate period of time is available for processing them. When the new aminoplast resins according to the invention are processed at the conventional moulding temperatures, good curing and a satisfactorily closed surface are achieved, together with a shortened moulding time. Damage to the processing equipment and the press plates, formation of cracks through overcuring and heat haze do not occur.

The illustrative embodiments which follow illustrate the present invention without limiting it.

EXAMPLE 1

A mixture of 4.04 kg of diethanolamine and 500 g of water in a round-bottomed flask is cooled to 5° C. by external cooling with ice water. 2.82 kg of glycidol are added dropwise in the course of 5 to 6 hours and 1 kg of crushed ice is added in portions during the dropwise addition. The external cooling is adjusted so that the temperature during the addition of glycidol is 5° to 10° C.

After the addition of glycidol is complete, stirring is continued for 5–6 hours at 10° to 15° and then for 12 hours at room temperature. The batch is then cooled to 10° to 15° C. by external cooling and $SO_2$ is passed in at this temperature until the pH value has fallen to 7.2, which requires 2.036 kg of $SO_2$. While the $SO_2$ is being passed in, twice 500 ml of water are also added in order to reduce the viscosity.

This gives 11.4 kg of a curing agent solution according to the invention, containing 78% by weight of active compound.

Turbidity measurements were carried out at various temperatures in order to test the curing action and the latency in comparison with known curing agents.

This was effected by adding to 4 samples, each of 100 g, of a commercial 50% strength aqueous melamine-formaldehyde precondensate, sufficient of each of the curing agent A according to the invention and of the known curing agents B, C and D, respectively, to produce turbidity times of 5 to 6 minutes at 100° C.

The determinations were then repeated using fresh samples of the same composition at 90°, 70° C. and 60° C.

The turbidity time is the interval of time from the introduction of the clear resin sample to which curing agent has been added into a bath, preheated to the temperature of the determination, until the appearance of the initial turbidity. It is a very useful measure of the reactivity of the resin under the influence of the curing agent.

These comparative tests gave the following experimental results. (Turbidity times)

|  | 60° C. | 70° C. | 90° C. | 100° C. |
| --- | --- | --- | --- | --- |
| 0.8% of curing agent A (according to the invention) | 74 minutes | 41 minutes | 8 minutes 30 seconds | 6 minutes |
| 0.5% of curing agent B | 36 minutes | 23 minutes | 6 minutes 30 seconds | 5 minutes 45 seconds |
| 0.25% of curing agent C | 60 minutes | 28 minutes | 7 minutes | 5 minutes 30 seconds |
| 0.5% of curing agent D | 55 minutes | 27 minutes | 7 minutes 30 seconds | 5 minutes |

If these values are standardised arithmetically to a turbidity time of 6 minutes at 100° C., they result in 74 minutes for curing agent A, 37 for B, 65 for C and 66 for D, at 60° C. This results in a latency for the curing agent according to the invention which is approx. 12% better at 60° C. than that of the best, known curing agent. Comparisons of the storage stability of samples of the composition indicated above at 20° C., using the initial turbidity as an assessment, result in 29 hours for the curing agent according to the invention and 18 hours each for the known curing agents B, C and D. This results in a latency, for the curing agent according to the invention at 20° C., which is as much as 61% better than that of the known curing agents.

The known curing agent B employed in the comparative tests is based on morpholine p-toluenesulphonate, curing agent C is based on ethanolamine hydrochloride and curing agent D is based on p-toluenesulphonic acid.

EXAMPLE 2

500 g of diethanolamine are warmed to 50° C. in a round-bottomed flask and 360 g of glycidol are added dropwise in the course of 5 hours at a temperature which rises slowly from 50° C. to 78° C. The reaction mixture is then stirred for a further hour at 86° C.

$SO_2$ is passed at 50° to 53° C. into 314 g of the product thus obtained until the pH value of an aqueous solution adjusted to approx. 50–80% by weight is 7.1. 400 g of a highly viscous, nearly colourless liquid are obtained, which can be employed as such or in the form of a 50–80% strength by weight aqueous or alcoholic solution as a latent curing agent for aminoplast resins.

The preparation of use of aminoplast resins according to the invention are described in the examples which follow. The known Kiton test used for checking the degree of curing of the resin layers is carried out as follows.

(a) For laminates.

Half of the material to be tested is introduced for 10 minutes into a boiling solution of the following composition: 1 l of water, 5 ml of concentrated sulphuric acid and 1 ml of a 2% strength aqueous solution of Acid Red 45 (C.I.). The degree of colouration is then compared with a scale of 6 gradations, in which gradation 1 indicates no colouration and gradation 6 indicates a considerable colouration. Gradation 1 denotes satisfactory curing and gradation 6 can be correlated with inadequate curing.

(b) For coated chipboard:

1 ml of a solution of the following composition: 20 ml of concentrated sulphuric acid and 20 ml of a 2% strength aqueous solution of Acid Red 45 (C.I.) are applied to the surface to be tested, which is covered with a watchglass. After 2 hours, the degree of the colouration is assessed using the scale of 6 gradations mentioned above.

The percentages indicated in the examples and percentages by weight.

EXAMPLE 3

94 kg of 39% strength aqueous formaldehyde solution, 77 kg of melamine, 4.5 kg of a 40% strength aqueous solution of sodium amidosulphonate, 1.4 kg of methanol and 0.4 kg of 2 N sodium hydroxide solution were subjected to a condensation reaction at 90°–95° C. until the product could be diluted with water in the ratio of 1:2. 35 l of water and 15 kg of crude methylenebisformamide in the form of a 50% strength aqueous solution and 1.2%, calculated on solid resin, of the latent curing agent according to the invention, prepared in Example 1, were then added to the cooled solution. A decorative paper weighing 110 g/m² was impregnated in this solution to a resin of approx. 58% and was then dried to a volatile content of 5–6% determined by weighing a sample before and after drying at 160° C. for 5 minutes).

The paper was pressed onto chipboard weighing approx. 700 kg/m³ in a single-daylight press under the following conditions:

Contact time until full moulding pressure is reached approx. 5 seconds, moulding time: 38 seconds, moulding temperature: underside 145° C., upper side 148° C. (object temperature), moulding pressure 20 kp/cm².

After the hot moulding process, no overcuring lines (heat haze) were observed on the underside of the sheet. The coated chipboard produced had a satisfactory, closed surface. The degree of curing corresponded to gradation 2 on the Kiton scale of 6 gradations. Testing the resistance to cracking as specified in DIN 53,799–4.7.3. after 20 hours' storage at 70° C. in a heated cabinet with air circulation led to level 0 for the tendency to cracking (decorative surface with no crazing).

EXAMPLE 3a (COMPARISON EXAMPLE)

A 20% strength aqueous ammonium chloride solution was added to a melamine resin solution, prepared in accordance with Example 1a, instead of the 1.2%, calculated on solid resin, of latent curing agent according to the invention, prepared in Example 1, and the product was processed to form a coated chipboard under the same conditions. After release from the mould, the underside of the sheet obtained has a surface which is considerably impaired by heat haze. The degree of curing corresponds to gradation 2 of the Kiton scale of six gradations. The surfaces of both sides are closed, but cracks are observed after heat treatment for 20 hours at 70° C.

EXAMPLE 4

94 kg of 39% strength aqueous formaldehyde solution, 77 kg of melamine, 4.5 kg of a 40% strength aqueous solution of sodium amidosulphonate, 1.4 kg of methanol and 0.41 kg of 2 N sodium hydroxide solution were subjected to a condensation reaction at 90°–95° C. until the product could be diluted with water in the ratio of 1:2. 35 l of water and 15 kg of crude methylenebisformamide in the form of a 50% strength aqueous solution and 0.6%, relative to solid resin, of the latent curing agent according to the invention, prepared in Example 1, were then added to the cooled resin solution.

A printed (linen pattern) decorative paper weighing approx. 110 g/m² is impregnated in this solution. The resin content was approx. 56.5% (relative to the final weight of the paper) and the volatile content (5 minutes/160° C.) was 5.6–5.9%. The papers were pressed onto a chipboard with an average bulk density of 720 kg/m³ at an object temperature of 135° C., a heating time of 3 minutes and a cooling time of 4–5 minutes, depending on the cooling water temperature, and a moulding pressure of 20 kp/cm².

MOULDING LAY-UP

Heating plate; asbestos pad, approx. 1200 g/cm²; press plate with a high gloss chrome finish; decorative paper, as described; chipboard, bulk density 720 kg/m³; press plate as above; asbestos pad, approx. 1200 g/cm²; transport plate; heating plate.

After release from the mould at approx. 85°–95° C., a coated chipboard is obtained, which has a satisfactory, closed surface corresponding to gradation 2 in a Kiton test. After heat treatment, which is carried out for 20 hours at 70° C., no formation of cracks could be observed.

EXAMPLE 5

100 kg of melamine, 152.5 kg of 39% strength aqueous formaldehyde solution, 20 kg of methanol, 5 kg of sorbitol, 2 kg of caprolactam and 2 kg of 2 N sodium hydroxide solution are subjected to a condensation reaction at pH 8.5–9.5 and 90°–95° C. with continuous control of the pH value until the product could be diluted with water in the ratio of 1:2.0. After cooling, 25 l of water and 0.6% of the latent resin according to the invention, prepared in Example 1, are added to the solution. An overlay paper weighing approx. 30 g/m² and a printed decorative paper weighing approx. 110 g/m² are impregnated in this resin solution. The resin impregnation was adjusted as follows:

Overlay paper, resin content: 70%, volatile content: 7%, decorative paper, resin content: 45%, residual moisture content: 5.5%. The impregnated papers were compressed in a multi-daylight press together with craft papers which had been impregnated in phenolic resin.

MOULDING LAY-UP 1 heating plate; craft paper pad 100 g/m²; 1 press plate; 1 overlay paper, impregnated; 1 decorative paper, impregnated; 5 craft papers impregnated in phenolic resin, resin content: 35–37%, volatile content: 5%, 1 craft paper impregnated in phenolic resin, resin content: 37%, volatile content 7%; 2 separating papers, 1 phenolic resin paper, as described; 5 phenolic resin papers, as described; 1 decorative paper; 1 overlay paper; 1 press plate; paper pad composed of craft paper, 1200 g/m²; 1 transport plate; 1 heating plate.

The moulding time was 6 minutes and the cooling time 4–5 minutes. The moulding temperature (object) was 140° C. and the moulding pressure 80 kg/cm². After release from the mould, a satisfactorily closed surface is obtained. The Kiton test corresponds to gradation 2. Another subjecting the laminate to heat treatment at 80° C. for 20 hours as specified in DIN 16,926, May edition 1975 or DIN 53,799 4.7.1., May edition 1975, no formation of cracks is observed.

EXAMPLE 5a (COMPARISON EXAMPLE)

3,450 ml of a 50% strength aqueous solution of diethanolamine acetate are added to the resin solution prepared in accordance with Example 5 instead of the curing agent employed in Example 5, and processing is carried out as in Example 5. This gives a laminate which, after curing, only corresponds to gradation 4.

EXAMPLE 5b (COMPARISON EXAMPLE)

173 ml of a 50% strength aqueous solution of ethanolamine hydrochloride are added to the resin solution prepared in accordance with Example 5 instead of the curing agent employed in Example 5a and further processing is carried out as in Example 5. The laminate produced exhibits a closed surface and a degree of curing of 2, but there is pronounced formation of cracks after heat treatment, which was carried out for 20 hours at 80° C.

We claim:

1. A latent curing agent for aminoplast resins comprising the reaction product of diethanolamine, glycidol and $SO_2$ in a molar ratio of 1:(1.0 to 1.2):(0.5 to 1.0), respectively.

2. A latent curing agent according to claim 1 wherein the molar ratio of the reaction product is 1:(1.0 to 1.2):(0.7 to 0.85).

3. The process for manufacture of a latent curing agent for aminoplast resins comprising (a) reacting diethanolamine with glycidol at 0° to 90° C., in a molar ratio of 1:1.0 to 1.2 and (b) reacting the product from (a) at 0° to 90° C. with 0.5 to 1.0 mole of $SO_2$ per mole of diethanolamine.

4. The process according to claim 3 wherein step (b) is carried out with 0.7 to 0.85 mole of $SO_2$ per mole of diethanolamine.

5. The process according to claim 3 wherein the reaction temperature of step (b) is from 10° to 55° C.

6. The process according to claim 3 wherein steps (a) and (b) are carried out in the presence of 10–50% by weight of water as a diluent.

* * * * *